Nov. 24, 1931.   J. T. BUIJGERS   1,833,516
SAFETY DEVICE FOR LOCOMOTIVES OR RAILWAY MOTOR VEHICLES
Filed Nov. 30, 1927   5 Sheets-Sheet 1
Fig:1.
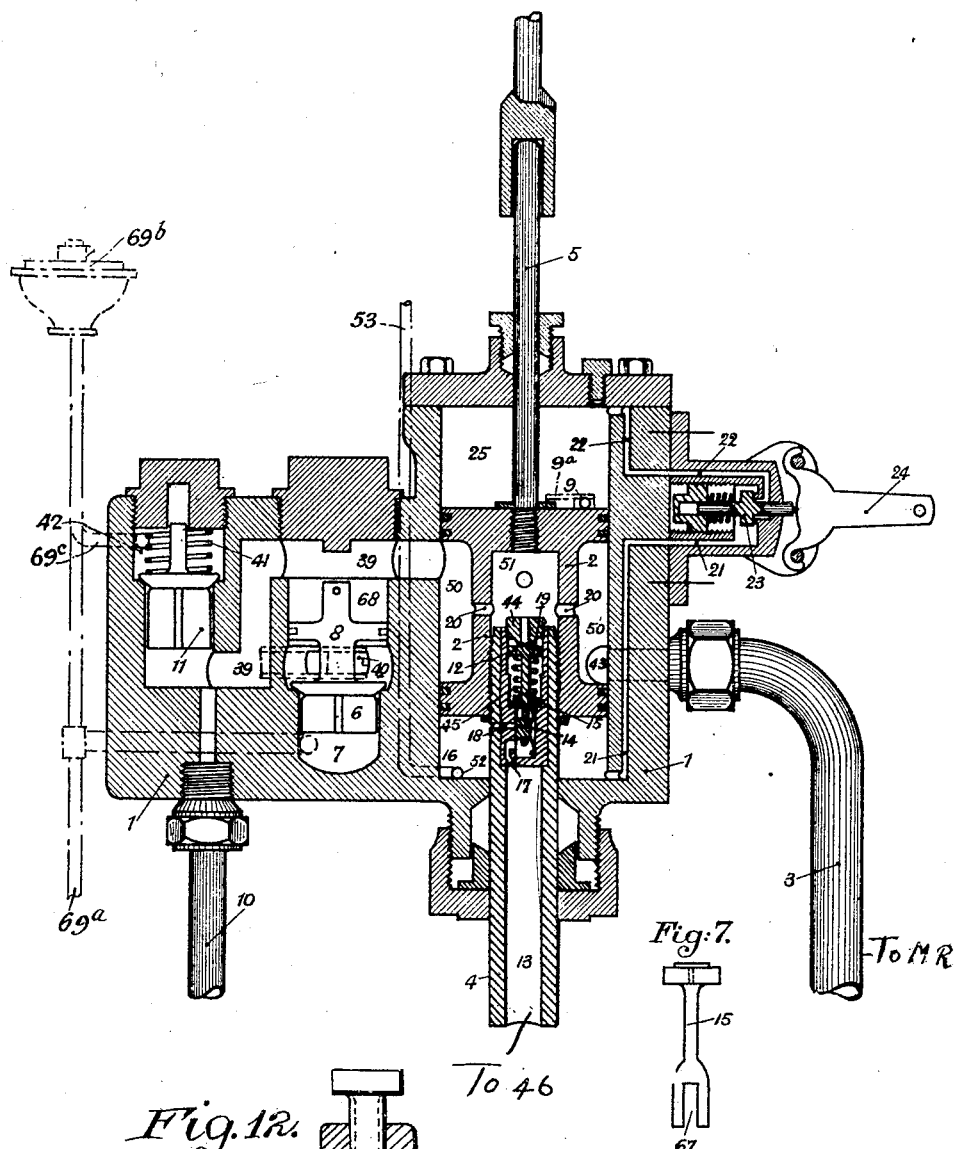
Fig:12.
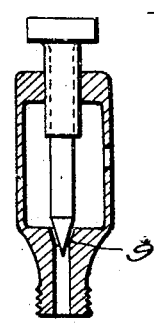
Witnesses:
R.W.G. Jzeren
A. Brouwer
Inventor:
Johannes Theodorus Buijgers
by W. Pataky
his Attorney.

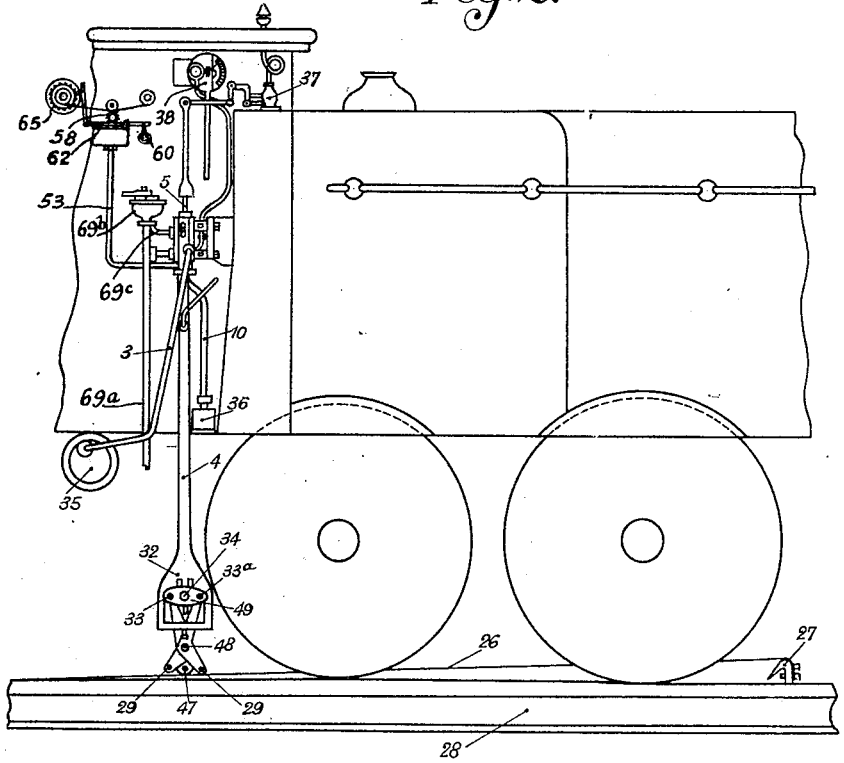
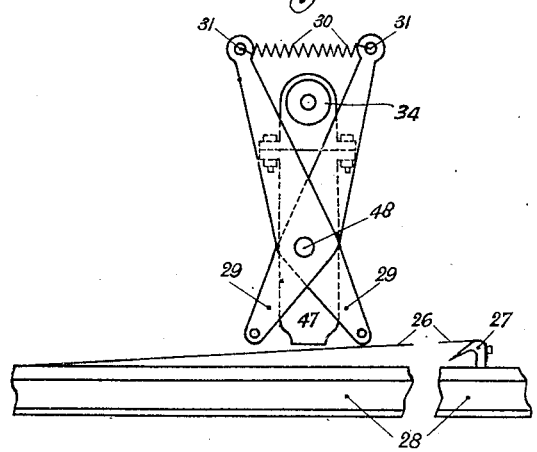
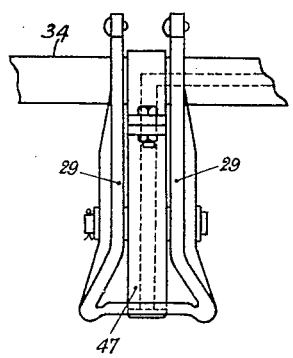

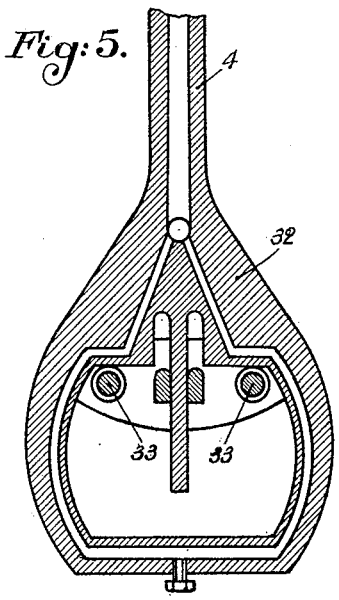
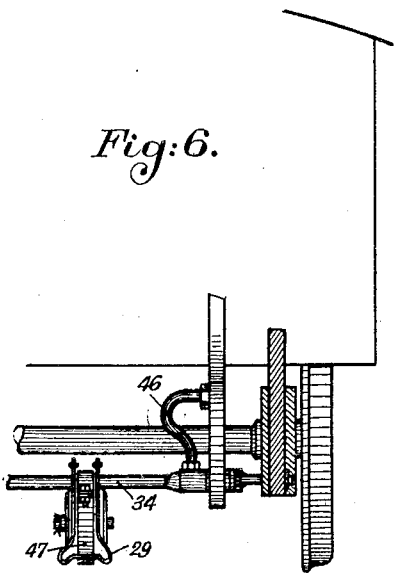
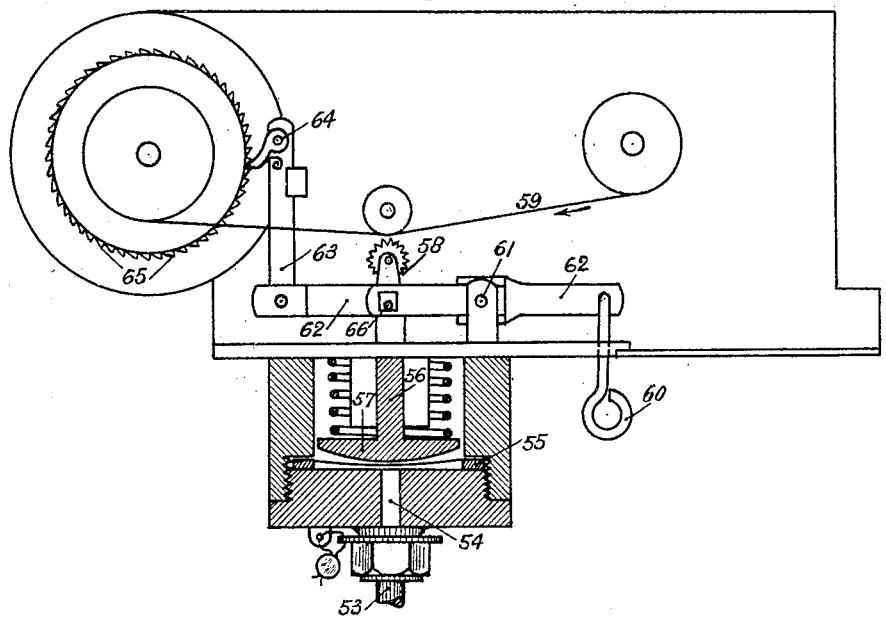

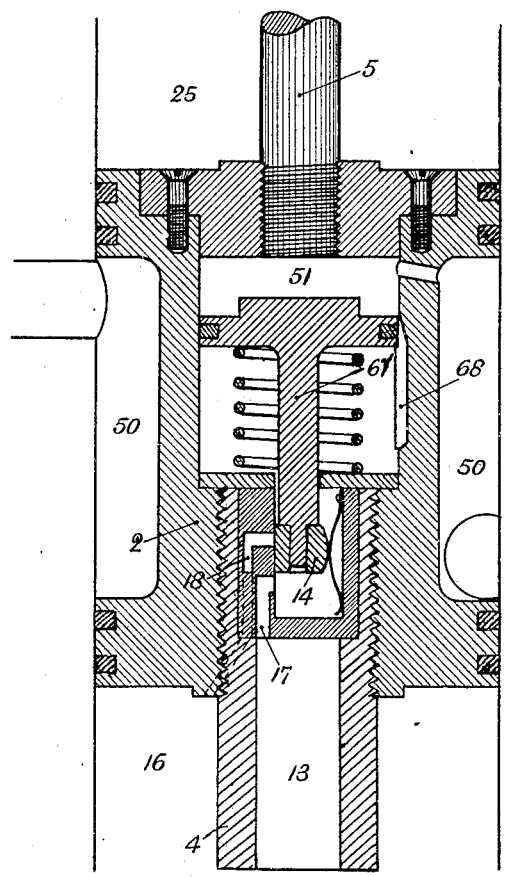

Nov. 24, 1931.  J. T. BUIJGERS  1,833,516
SAFETY DEVICE FOR LOCOMOTIVES OR RAILWAY MOTOR VEHICLES
Filed Nov. 30, 1927  5 Sheets-Sheet 5
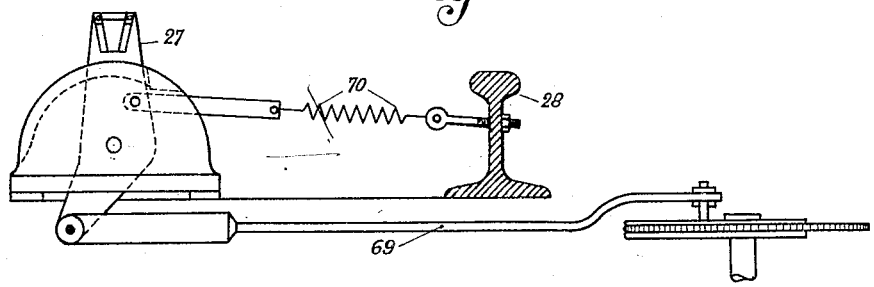
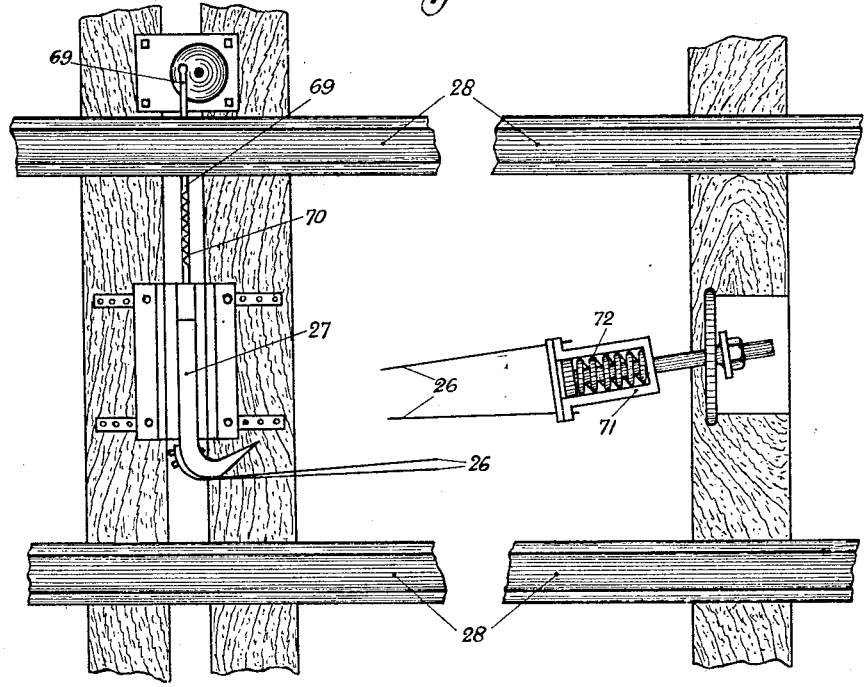

Patented Nov. 24, 1931

1,833,516

UNITED STATES PATENT OFFICE

JOHANNES THEODORUS BUIJGERS, OF APELDOORN, NETHERLANDS

SAFETY DEVICE FOR LOCOMOTIVES OR RAILWAY MOTOR VEHICLES

Application filed November 30, 1927, Serial No. 236,727, and in the Netherlands December 4, 1926.

This invention relates to an improved safety device for locomotives or railway motor vehicles for which I filed an application for patent in Holland on December 4, 1926, embracing a contact mechanism arranged between the rails, which automatically operates a device by means of a stop lever moved by said contact device which warns the engine driver by a signal and applies the brakes. The automatic braking however may be prevented or rendered superfluous if the engine driver immediately pays attention to the warning signal emitted.

The invention has for an object to provide a new and improved braking mechanism.

A further object is to provide an improved braking mechanism automatically operative and of such organization that hazard to the vehicle to which it is attached owing to failure of the device to work will be rendered practically negligible.

The present invention is characterized by the following features:

The period of time which elapses before the brake is applied automatically, a period which is determined by the time required for the operation of the braking apparatus to reach its final braking position, is controlled by a setting device, arranged in such manner that the moment at which automatic braking takes place, can be varied and determined beforehand as desired.

The train, stopped by means of the safety device, can only proceed if and when the safety device has been returned to its original position.

If the stopping device provided on the engine and adapted to strike against the contact mechanism, between the rails, should break, the engine driver's attention will immediately be drawn to this fact in three different ways:

(a) By the automatic blowing of the whistle put in action upon breaking of the arrangement or of its parts.

(b) By the brake pipe being simultaneously put into communication with atmospheric air, so that the brakes cannot be released and the train so prevented from proceeding.

(c) By the fact that the pressure gauge, connected to the interior of the hollow stopping device, indicates a lower pressure than that of the pressure gauge connected to the main compressed air reservoir and a visible or audible signal is thus given.

The improved device assures the greatest possible factor of safety, as a safety device is only reliable when it acts as such in every circumstance and if the action produced on the engine cannot be intentionally eliminated.

My invention has for one of its objects the particular arrangement of the safety device so that it automatically causes the brake to be applied only after the expiration of a previously determined period of time. The engineer, after having been warned by the first notes of the signal whistle, will thus be given an opportunity to apply the brakes by hand. According to the invention this object is realized by providing a variable cross-section of the discharge opening. Through this opening the compressed air escapes from the space above the piston, connected to the valve shutting off the brake pipe from the atmospheric air, and the pressure therein closes the valve. This variation of the free cross section is preferably obtained by means of an adjustable valve. In order to provide the highest possible security, this adjustable valve is preferably arranged in such manner that the same may never be completely shut.

A further object of my invention is to prevent the train, after its having been stopped by the safety device from resuming its run before the device has been returned to its normal position. To this end I provide a distributing or distributor slide, whereby the valve which shuts off the brake pipe from the atmosphere is held in the closed position due to the pressure exerted by the compressed air when the said distributor valve is in the central position corresponding to the working or operative position of the safety device. The result of this is that the brake pipe can only be shut off from atmospheric air when the distributor valve occupies the central or normal position.

The invention further provides means whereby, in the event of a rupture of the stop lever, the pressure of the compressed air is transmitted under the distributing valve of the safety device. Such means comprise a distributing slide valve arranged within the distributing device whereby the latter may be moved to its highest position when the brake pipe communicates with the atmospheric air, thus effecting the application of the brakes.

In addition to the advantages obtained, the construction provides the additional advantage that in the event of bending or sagging of the parts situated under the engine, the distributing device will be brought to its lowest position whereby the compressed air will escape from the space above the valve, which space shuts off the brake pipe from atmospheric air, the pressure in which space keeps the valve in the closed position.

From the constructional point of view, the carrying into practical effect of the principles mentioned is made possible by the movement of a stop lever producing the upward movement of a cylindrical distributing valve connected to the said lever, acting in a cylinder closed at both ends, and owing to the movement in question being assisted by the pressure of the main compressed air reservoir beginning to act under the said valve due to the upward movement of the cylindrical valve.

One construction embracing the invention is illustrated by way of example in the accompanying drawings.

Figure 1 shows a vertical section through the distributing device and the hollow rod that acts on the said distributing device operated by the stop lever.

Figure 2 shows, in side elevation, the arrangement of the safety device on the engine.

Figure 3 shows a preferred construction of the stop lever.

Figure 4 shows the same stop lever turned through an angle of 90°.

The device shown in Figure 1 is mounted in the main conduit supplying compressed air to the train pipe, said main conduit being itself connected to the main compressed air tank with the brake valve. The device is designed to provide a four-way connection between the main compressed air tank, the train pipe, the atmosphere and the registering mechanism.

While in operative position compressed air from the main tank will be admitted to flow through the brake valve into the train pipe. In this position the train pipe is shut off from the atmosphere by the movement of the piston, due to the pressure exerted upon the latter.

In striking against a contact device provided in a suitable manner on the trackbed, the connections of the four-way device are reversed. In this position the air escapes freely into the atmosphere and the check valve is closed. The outlet opening of the air is adjustable so that the time can be regulated within which the pressure acting upon the head of the piston will become sufficiently low to cause the pressure under the valve to open same and thereby connect the train pipe with the atmosphere and cause the brakes to be applied. According to the invention the section of the outlet opening for the compressed air remains the same after adjustment so that the period of time required before the train pipe opens will always be the same.

Figure 5 is a longitudinal section through the lower part of the hollow rod.

Figure 6 shows the suspension of the stop lever on the engine.

Figure 7 is a portion of the bifurcated valve rod.

Figure 8 shows an indicator device which makes it possible to check the engine driver in order to ascertain whether he has operated the device or whether the brakes were applied automatically, that is to say without the co-operation of the engine driver.

Figure 9 shows a modified construction of the piston valve.

Figure 10 shows, in front elevation, the contact device arranged between the rails when the danger signal is given.

Figure 11 shows in plan view the contact device arranged between the rails so as to cause the signal to be given.

Figure 12 illustrates the means for adjusting the size of the opening in the piston valve.

The casing 1, in which is mounted the cylindrical distributing valve 2, is connected by the pipe 3 (Figures 1 and 2) to the main compressed air reservoir 35. A hollow setting rod 4, moved by the stopping device (Figures 2 and 3), is secured to the piston valve 2 and operates the safety device.

Moreover, on the distributing valve is arranged a rod 5 adapted to act on the steam whistle 37 for giving the signal. The valve 6 closes the brake pipe space 7. To the valve 6 is connected a piston 8, acted upon by pressure in conduit 39 to keep the valve 6 in a closed position. The opening 9 provides communication between the piston chamber 25 and the atmosphere. The said vent or opening may be made variable by any suitable means, as by a slide 9a, movable across the opening for closing the same more or less. By making the vent variable in the manner set forth, the same may be adjusted so as to retard the escape of air from the braking system sufficiently to give the engineer time to manually open the exhaust in the brake system, and thereby avoid operation of the automatic exhaustion through the herein described apparatus. In addition to the main reservoir the casing 1 is also connected by means of the connecting pipe 10 to a smaller auxiliary reservoir 36. The check valve 11 cuts off the space communicating with the engineer's brake valve from the space above the piston 8. This piston, by means of the valve 6 that is secured to it, keeps the brake pipe space 7 closed. The valve 12, which shuts off the interior 13 of the hollow rod 4 from the inner space 51 of the distributing valve 2, prevents the compressed air passing, in the highest position of the piston valve, from the main reservoir through the space 16 and conduit 18 and, by raising valve 14, into the space 51.

The valve 14 is a flat distributing slide valve which is moved by means of a rod 15 provided with a fork 67 (Figure 7) and is intended for shutting off the three spaces 16, 13 and 51 from, or connecting them to, each other. The conduits 17 and 18 establish communication between the space 16, situated under the distributing device, and the inner space of the hollow rod 4. A conduit 19, provided in the valve 12, is intended to admit compressed air from the main reservoir through the conduit 17 into the space 13. The rod 15 in the construction shown in Figure 9, is replaced by a piston valve 67', which regulates in a simple manner the connection of the chamber 51 to the chambers 13 and 16, namely by means of a recess 68 provided in the inner wall of the piston valve 2. The space 16, situated below the distributing valve 2, can be connected to the space 13 above the distributing valve by means of a valve 23 which cuts off the connecting conduit constituted by the passages 21 and 22. The valve 23 may be operated by means of a lever 24.

The stop device is operated by means of a contact device arranged between the rails 28.

The contact device (Figures 10 and 11) is arranged on the line between the rails in proximity to some signal post, for instance at a distance of about 600 meters therefrom, and is operated simultaneously with the semaphore arm of the post.

In detail the arrangement comprises a hook 27 arranged between the rails and disposed vertically upwards when the corresponding signal is set to "danger". This hook is connected by means of a transmission rod 69 to the operating mechanism of the signal post acting as a control for the movements of hook 27, in such a manner that when the signal gives a clear line indication, the hook 27 is turned by the rod 69 into the horizontal position, against the action of a tension spring 70 provided on one of the rails.

This spring 70 is also intended to pull the hook 27 into the vertical position in the event of the transmission rod 69 getting out of order.

As an additional precaution, the hook may also be connected to a control device by means of which the signalman would be able to check in his cabin the position of the hook 27 at any moment.

From the hook 27 a number, preferably two, of strong guiding wires or rods 28 are carried to the holder 71 which is arranged at a certain distance from the hook and between the rails.

In order to ensure that wires, when in use, are kept taut the holder 71 may be provided with a spring 72.

The parts are arranged in such a manner that when the hook 27 is in its vertical position, the wires 26 project above the level of the rails. When however the hook 27 is turned into the horizontal position, the wires 26 will also be turned into a plane situated below the plane of the upper surface of the track.

The stopping device (Figures 3 and 4) comprises a stop lever 47 and two protecting brackets 29 hinged together by means of the pin 48; the brackets 29 are made elastic in operation, by connecting their two upper ends by means of a spring 30. The hollow rod 4 is provided at its lower end with a pin 34 to which is secured a flange provided with two pins 33 and 33a.

The space 16 (Fig. 1) underneath the piston valve 2 is connected to space 54 (Fig. 8) through the opening 52, which latter extends from the space 16 into the inside of pipe 53 (Fig. 8) leading into space 54. The diaphragm 55 is in contact with a pressure plate 57 formed on the lower end of a rod 56 provided with a perforating or punching wheel 58. The lever 62 is pivotally mounted on a pin 61 and is provided with a handle 60. The rod 56 carries a pin 66 by means of which it can be raised by the lever 62. Connected to lever 62 is a connecting rod 63 on which is mounted a pawl 64 adapted to act on the ratchet teeth 65 of a roller on which is wound the band 59 of the automatic recording speed indicator.

The space 42 is connected on the one hand to the brake pipe 69a through brake valve 69b by means of pipe 69c and on the other hand, by means of the conduit 39, to the outer space of the piston valve 2, the pipe 3 and to the main reservoir. When the valve 6 is raised the brake pipe space 7 will be in communication with atmospheric air through the opening 40.

A screw plug 44 is screwed into the rod 4. A flexible hollow pipe 46 constitutes the connection between the interior of a pin or spindle 34 and the interior of the rod 4. The piston 8 operates in the cylinder 68. If said spindle 34 is turned to the left, the pin 33a is raised and the pin 33 is lowered and vice-versa. The spindle 34, shown in Figures 2, 3, 4 and 6, is mounted for pivoting movements upon the frame of the engine. When the brackets 29 come into contact with the sloping part 26 they will cause an angular displacement of spindle 34 whereby rod 4 is moved in an upward direction by means of the pins 33 and 33a.

The device is arranged on the locomotive between the connecting pipe 3 of the main compressed air reservoir and the brake valve.

The operation of the safety device is as follows:—

Figure 1 shows the piston valve 2 in the position of rest. The brackets 29 are brought into contact with the contact devices between the rails 28 as arranged in the event of the driver overrunning a danger signal. The piston valve 2 in the position shown is in equilibrium namely, under the action of the pressure from the main reservoir 35 acting on the inner face of the piston valve. In this position, compressed air is free to pass from the main reservoir 35 through the outer space 50 into the space above the valve 8. This valve, together with the valve connected to it, will be depressed, and consequently the brake pipe space 7 which is directly connected to the brake pipe will be maintained shut off from the opening 40 communicating with the atmospheric air owing to the pressure of the main reservoir 35.

By means of the check valve 11, controlled by a spring 41, the air from the main reservoir 35 passes into the space 42. The spring 41 acts to maintain the check valve seated but the valve is raised by pressure of air from reservoir 35 to permit air to pass into space 42. This space 42 is connected to the brake valve so that the air from the main reservoir can be admitted into the brake pipe.

The auxiliary reservoir 36 is filled with compressed air from the main reservoir by means of the pipe 10.

Compressed air from the main reservoir passes through the passage in screw plug 44 and moves the valve 12 slightly downwards away from the plug 44 in opposition to the pressure of spring 45, so that air can enter the space above the valve 12. The compressed air passes from this space to the conduit 17 through a small opening 19, in the valve 12, and from the conduit 17 the compressed air passes into the interior 13 of the hollow rod 4 which is connected through a flexible pipe 46 (see Fig. 6) to the horizontal pin or spindle 34 on which is mounted the stop lever 47. The pin 34 and the lever 47 are both hollow so that the air may pass through them from the main reservoir.

When the engine overruns a danger signal, one of the elastic brackets 29 comes in contact with the contact device 26 arranged between the rails 28. The two brackets 29, connected together by a spring, act as a shock absorber and are rotatably mounted by means of a pin 48 on the stop bracket proper. Owing to the bracket 29 coming in contact with the contact device 26, the stop lever 47 is turned so that the horizontal spindle 34 is operated and the pins 33 and 33a which are connected by means of the flange 49 to the pin 34 are moved upwards or downwards respectively. The upwardly moved pin forces upwardly the member 32 and the rod 4 to which is secured the piston valve 2. The piston valve 2 is therefore moved upwardly out of its central position when the engine overruns a danger signal. Owing to this movement the mouth 43 of the compressed air pipe 3 is brought under the piston valve so that the space 16 is connected to the main reservoir 35.

The piston valve 2 will now be moved up further by the action of the rod 4 assisted by the action of the pressure of the main reservoir in the space 16. In this way the pressure exerted by the stopping device on the rod 4 will be automatically relieved. The rod 5 will then be raised with the piston valve and this rod actuates a steam whistle to warn the engine driver. The engine driver may then allow the compressed air to escape from the brake pipe in the usual manner by means of the brake valve and thus stop the train.

One of the advantages obtained by the present invention is that no more air, than is contained in the brake pipe, can escape as the main reservoir is shut off because the piston valve 2 is positioned above opening 43 and cuts off the reservoir 35.

If, as soon as the line is unblocked, the engine driver wishes to release the brakes, he must again admit compressed air from the main reservoir 35 into the brake pipe. This can be done only if the piston valve is in its central position which is the position of rest of the safety device.

To enable the brakes to be released and the train to proceed, the piston valve 2 must be brought back to the above mentioned central position by the engine driver turning the lever 24 upwardly or downwardly so that the valve 23 is opened and the space 25 is connected through the conduits 21 and 22 to the space 16. The pressure is equalized in these two spaces and as the piston face at the top of the piston valve is greater than at the bottom owing to the difference in diameter of pipe 4 and the rod 5, the piston valve will be moved downwards into the position of rest. The train can then proceed.

In the event of the engine driver disregarding the warning signal of the steam whistle, the device, after the expiration of a certain time, automatically discharges the compressed air from the brake pipe thus stopping the train. This takes place in the following manner:—

When the piston valve 2 is in its highest position, the space 39 is connected through the outer space 50 of the piston valve to the opening 9 communicating with the atmospheric air. According to the size of this outlet opening the pressure of the air escaping from the space 39 and from the auxiliary reservoir 36, connected thereto by the pipe 10, drops more or less quickly depending upon the size of the supplemental reservoir and the size of the opening 9. The object of the valve 11, which is closed by the spring 41 and the pressure in space 42 when the pressure in space 32 is reduced, is to prevent air from the space 42, connected to the brake valve, from getting into the space 39 when the latter is empty thereby counterbalancing the upward thrust exerted on valve 6. The capacity of the auxiliary reservoir 36 is such that a certain time is required for emptying it, which time is determined by the size of the opening 9.

When the pressure in the space 39 has dropped to a sufficient extent, the pressure in the brake pipe space 7 will raise the valve 6, and air in the brake pipe can then escape through the opening 40 so that the brakes will be applied and the train stopped.

Therefore, since it requires a certain predetermined time for the supplemental reservoir 36 to empty, it follows that a certain time elapses between the upward movement of the piston valve 2 and the opening of the valve 6. The relation of the reservoir 36 and the adjustment of opening 9 to the casing may also be such that sufficient time will elapse between the movement of the valve 2 and the opening of the valve 6 to give the engine driver an opportunity to apply the brakes by means of the brake valve, after he has been warned by the steam whistle.

For releasing the brakes as soon as the line is clear, the engine driver has to move the piston valve down again, namely by opening the valve 23 by means of the lever 24.

When a part of the safety device such as for instance the stop lever 47 or the spindle 34 is damaged, atmospheric pressure will at once prevail in the interior 13 of the hollow rod 4, as this interior is connected to the interior of the spindle 34 and the lever 47 and the brakes will be applied and the compressed air tank closed automatically as a result of upward movement of valve 2, as previously described.

Compressed air will therefore flow from the main reservoir 35 through the openings 43 and 20, through the opening 19 of the valve 12 and the slide valve opening 17 into the interior 13 of the rod 4. Owing to the opening 19 being very narrow, and owing to the interior 13 being connected to the atmospheric air a downward force will continue to act on the valve 12 and move it downwardly until the slide valve 14 has closed the opening 17 and opened the conduit 18.

After the valve 14 has opened the conduit 18 the space 16 will be connected to the main reservoir and the slide valve will be moved upwards.

The outlet opening 43 of the main reservoir opens then into the space 16, so that the main reservoir is disconnected from the brake pipe and as the space 39 is connected to the opening 9 it is put into communication with the atmosphere with the result that the valve 6 is raised and the air escapes from the brake pipe.

As the valve 14 is not secured to the valve rod 15 but merely placed loosely in the open fork 67 of the valve rod 15, the valve 14 will remain in its lowest position. The device can only be rendered ready for operation again by dismantling and repairing it.

In the event of the parts of the device which are under the locomotive, such as for instance the spindle 34, being bent the piston valve 2 will be moved downwards, and the space 39 will also be connected to the opening 9 so that the brakes will be applied in the usual manner. Only after the device has been properly repaired will the train be able to proceed.

The operation of the indicator device is as follows:—

By means of the indicator device provided on the safety device, a record will be made on the band of an automatically recording speed indicator or speedometer provided on the engine whenever the safety device is operated or whenever the stop lever is brought from the operative into an inoperative position. A device is provided on the indicator device by means of which the engine driver himself can make such a record on the band. In this way the locomotive driver is in a position to indicate on the band that he observed that the device could be operated and that he paid attention to the signal.

Next to the opening 52 (Figure 1) of the pipe 53 (Figure 8) under the piston valve 2 is arranged the space 16 (Figure 1) which is connected to the space 54 under the diaphragm 55. On said diaphragm rests a pressure plate 57 provided at the lower end of a rod 56. The rod 56 carries a perforating or punching wheel 58 or a like member adapted to act on the band 59 of the automatic recording speed-indicator. If, owing to the operation of the safety device, the pressure of the main reservoir is transmitted to the space 16 the said pressure will be transmitted through the opening 52 and pipe 53 into the space 54 under the diaphragm 55. The diaphragm 55 will thus be raised. The pressure plate 57, with the rod 56, will be raised and by means of the perforating wheel 58 a regular record will be produced on the band 59 of the automatic recording speedometer.

When the engine driver operates the handle 60 the lever will be turned about the fulcrum 61. The rod 56 is moved upwardly by means of pin 66 and the perforating wheel 58 is pressed against the band 59 and a record thus being produced on the band. The band 59 is moved slightly by means of the connecting rod 63, ratchet gear 64 and teeth 65.

When the recording device is operated as a result of automatic operation of the brakes the rod 56 will press the perforating wheel 58 against the band and on the latter will be produced a second record at a certain distance from the record made by the driver.

When the engine driver has indicated that he had noticed that the device could be operated and when he has operated the handle 60, then an irregular record will be produced on the band which will be different from the record made if the engine driver fails to notice that the device could be operated.

The record produced by automatic operation of the recorder as a result of automatic operation of the brakes differs from the record produced by manual operation of the recorder by the engineer because in the manual operation of the recorder the band is moved while the perforating wheel 58 is in contact therewith thus rotating the wheel and producing an irregular record. The automatic operation results in one or two perforations of the band and the manual operation results in a number of perforations in the form of a track. Because of the differences between the two records on the band it is easy to determine whether or not the engineer responded to the signal to apply the brakes and operated the recorder in the interval before automatic brake application would take place.

What I claim is:—

1. In a pneumatic braking system including a compressed air reservoir and a brake pipe connected by a piston chamber; a distributor piston valve movable to and from position in said chamber for effecting braking action in the system, said piston valve having a chamber therein, a tubular control rod communicating with the chamber of the piston valve, a passage through the piston valve connecting the interior of the control rod with the chamber, and a yieldably seated valve in said passage controlling flow of fluid from the system into the control rod, and means operable when said yieldably seated valve is open for causing the piston valve to move to position for effecting braking action on the system.

2. In a pneumatic braking system including a brake pipe and a compressed air reservoir communicating with a chambered casing, said casing having a vent to the atmosphere toward one end; a distributor piston within the casing having a recess formed therein normally positioned to afford communication between the reservoir and brake pipe and to cut off communication between the reservoir and pipe from said vent, said piston being adapted when moved from its normal position to provide communication between the brake pipe and said vent, a normally closed hollow member communicating with the recess in the piston, a yieldably seated valve controlling flow of fluid into said member from the said recess, said member having an opening leading to the chamber beneath the piston, means normally closing the opening, said means being adapted to open said opening under influence of pneumatic pressure from said chamber when the yieldably seated valve is open.

3. A pneumatic braking system including a brake pipe, a compressed air reservoir, and a casing having a chamber provided with a vent to the atmosphere adjacent one end and having communicating passages both with said brake pipe and said reservoir, a distributor piston movable within said chamber, said piston being normally positioned to provide communication between said passages and so as to cut off communication between the passages and the vent, said distributor piston being formed with heads at opposite ends defining a recess providing communication between the pipe and reservoir when the piston is in normal position and through which the pipe communicates with the vent when the piston is displaced from normal position, the communication of the passage from the reservoir with the chamber being so positioned as to be below the piston when the pipe is in communication with the vent, said piston having a chamber formed therein which is in communication with the recess between the heads, a hollow member extending from the piston and normally closed against atmospheric air, said member communicating with said recess, a yieldably seated valve separating the recess from the interior of the said member, a vent in said member within the chamber and beneath the piston, means normally closing the vent and adapted to open the same under influence of movement of said yieldably seated valve.

4. An automatic safety device for railways, comprising in combination, a main compressed air tank, a brake valve, a main conduit for the compressed air connecting said brake valve to said air tank, a check valve mounted in said main conduit and a four-way connecting valve mounted upon said main conduit between the check valve and the main tank, a canal to the atmospheric air provided in the connecting housing, a connection between said valve and the main conduit, a connection therefrom to the canal, a registering mechanism, a pipe leading to said registering mechanism and a connection between said pipe and the atmosphere and the main tank.

5. An automatic safety device for railways, comprising in combination, a main compressed air tank, a brake valve, a main conduit for the compressed air connecting said brake valve to said air tank, a check valve mounted in said main conduit and a four-way connecting valve mounted upon said main conduit between the check valve and the main tank, an adjustable outlet into the free atmosphere provided in said connecting valve, a device for shutting off the train pipe from the atmosphere under the influence of the pressure in the main conduit between the check valve and the four-way connection, and an auxiliary reservoir connected to the main conduit between the check valve and the four-way valve connection.

In testimony whereof I have affixed my signature.

JOHANNES THEODORUS BUIJGERS.